M. J. B. BARBAROU.
BACK AXLE FOR MOTOR CARS.
APPLICATION FILED JUNE 10, 1920.

1,391,294.

Patented Sept. 20, 1921.

INVENTOR
MARIUS JEAN BAPTISTE BARBAROU
By
ATTORNEY

UNITED STATES PATENT OFFICE.

MARIUS JEAN BAPTISTE BARBAROU, OF PARIS, FRANCE.

BACK AXLE FOR MOTOR-CARS.

1,391,294. Specification of Letters Patent. Patented Sept. 20, 1921.

Application filed June 10, 1920. Serial No. 388,043.

*To all whom it may concern:*

Be it known that I, MARIUS JEAN BAPTISTE BARBAROU, citizen of the Republic of France, residing at 28 Rue St. Ferdinand, Paris, in the Republic of France, have invented new and useful Improvements in Back Axles for Motor-Cars, of which the following is a specification.

This invention has for its object improvements in the back axles of motor-cars. These improvements consist in the construction of the axle case by the union of two half-shells assembled by means of a weld, and the central portion of which is fitted with a stay-tube completing the connection.

The gear is arranged inside the said case in a special framing of such a kind that the portion that is purely mechanical can be introduced or withdrawn without having to dismount the elements of the said mechanical portion.

In the accompanying drawings by way of example:

The back-axle of the car is composed of two stamped half-shells A and B of steel assembled in a vertical plane as indicated at H by autogenous welding, brazing or riveting. At the central portion a tube C constituting a stay, connects the front half-box A to the rear half-box B. This tubular stay withstands the strains which, without its presence, have a tendency to separate the two parts of the case at the weld.

The gear for transmitting the motion to the wheels and the differential constitutes a block mounted in an armature D in such a manner that the fitting and the mounting are done completely before its introduction into the back axle. Nevertheless, in order to allow of inspecting the said gear in the back axle, a plate E is provided at the rear end and thus allows of getting access to the rear axle from that side. At the same time, this plate stiffens the central portion of the back axle.

The portion of the gear constituted on the other side is accessible as soon as the tube F has been dismounted that connects the back axle to the speed box.

Figure 1:
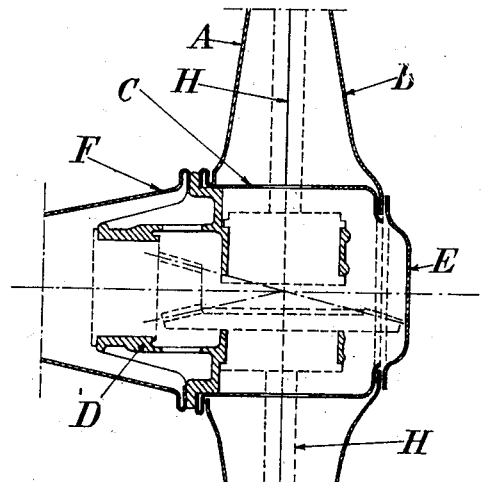
Figure 1 is a horizontal section along the longitudinal axis of the hind wheel axle of the car.
Figure 2:
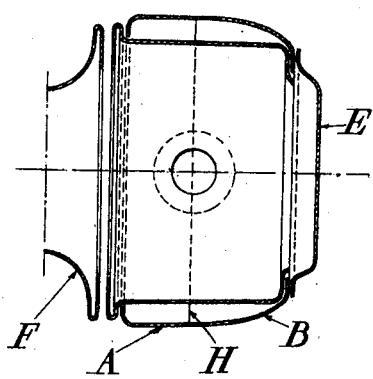
Fig. 2 illustrates the back axle in a section taken along the longitudinal axis of the car.
Figure 4:
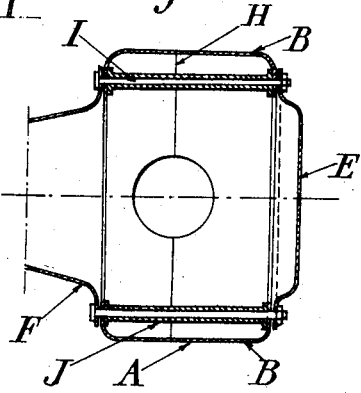
Figs. 4 and 5 are similar views of a modification of the apparatus according to this invention.
Figure 3:
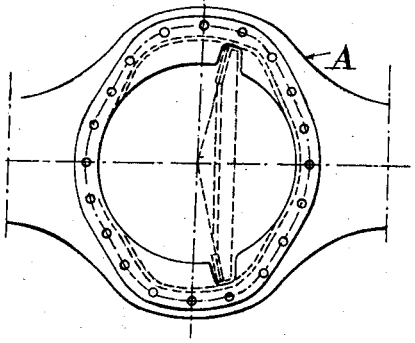
Fig. 3 shows the case of the back axle viewed from the side where the gear is inserted.
Figure 5:
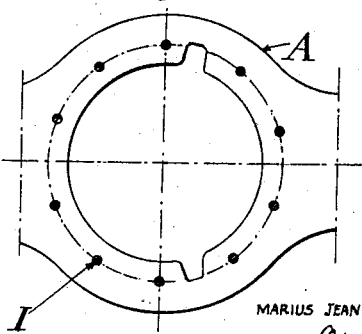

A modification is shown in Figs. 4 and 5 in which the stay-tube C is replaced by a series of bolts I assembling in the central portion of the back axle the two stamped pieces A and B.

A sleeve J is placed inside the back axle around each of the bolts in such a manner that the tightening of the bolts shall not lead to the crushing of the stamped parts, while assuring a suitable connection of these.

Having now described my invention, what I claim as new and desire to secure by Letters Patent is:

1. A back axle for motor cars comprising a back axle body formed of two half shells of stamped sheet metal secured to each other in a vertical plane along their entire length, a removable framing adapted to be inserted into the back axle body and to support the rear axle gearing, trussing means outside said framing adapted to act as a stay in the central portions of said half shells and fastening means for securing said removable framing and said trussing means in position.

2. A back axle for motor cars comprising a back axle body formed of two half shells of stamped sheet metal secured to each other in a vertical plane along their entire length, a removable framing adapted to be inserted into the back axle body and to support the rear axle gearing, trussing means outside said framing adapted to act as a stay in the central portions of said half shells and fastening bolts adapted to secure at the same time the back axle body, the removable framing and the trussing means to each other.

3. A back axle for motor cars comprising a back axle body formed of two half shells of stamped sheet metal secured to each other in a vertical plane along their entire length, a removable framing adapted to be inserted into the back axle body and to support the rear axle gearing, a tubular member outside said framing adapted to act as a stay in the central portions of said half shells and fastening means for securing said removable framing and said tubular member in position.

In testimony whereof I have signed my name to this specification.

MARIUS JEAN BAPTISTE BARBAROU.